July 15, 1952  H. A. VON HORTENAU  2,603,087

VISCOSITY MEASURING APPARATUS

Filed Aug. 7, 1950

INVENTOR.

Hans Alexander von Hortenau

BY

Cushman, Darby & Cushman

Patented July 15, 1952

2,603,087

UNITED STATES PATENT OFFICE 2,603,087

VISCOSITY MEASURING APPARATUS

Hans Alexander von Hortenau, Stockholm, Sweden, assignor of one-half to Stig Karl Magnus Billman, Stockholm, Sweden Application August 7, 1950, Serial No. 178,048
In Sweden May 3, 1950

2 Claims. (Cl. 73—59)

1

This invention relates to an apparatus for measuring or controlling the viscosity or concentration of a liquid in a conduit or vessel by means of a cylindrical member rotatable in the liquid.

An object of the invention is to provide an apparatus which yields very exact measuring results by eliminating the frictional losses occurring in apparatus of this kind. Another object of the invention is to provide an apparatus constructed in such a manner that it need not be inserted into and taken out of the conduit or vessel for the liquid, but may be provided, for instance, in a conduit which by-passes the vessel. A further object is to provide an apparatus constructed such as to avoid the necessity of taking samples of the liquid to be controlled so that the apparatus may be permanently connected to a treatment vessel for the liquid so as to give continuous measuring results.

Figure 1:
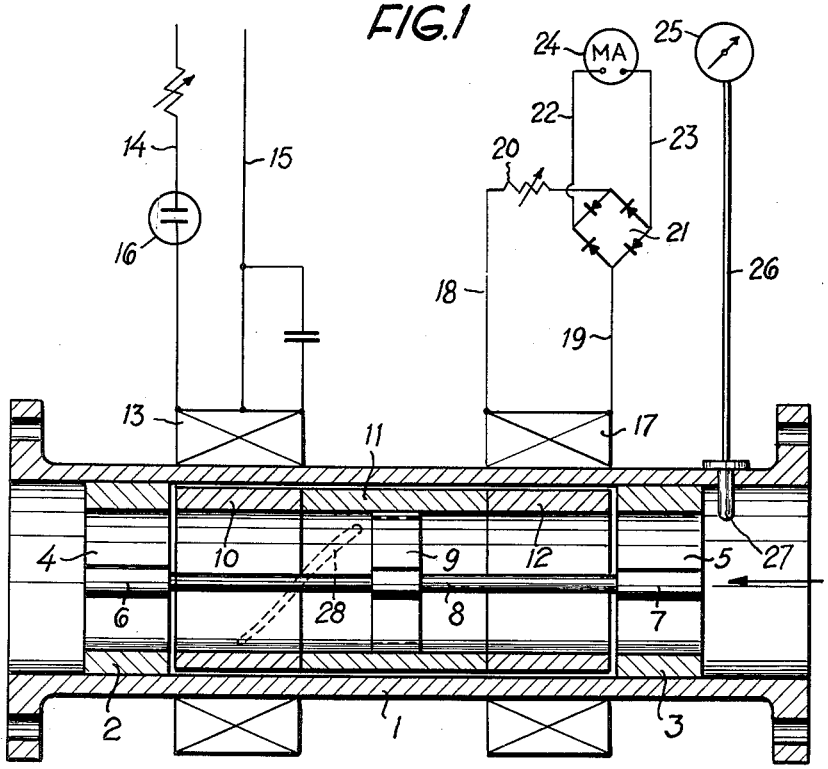
Figure 2:
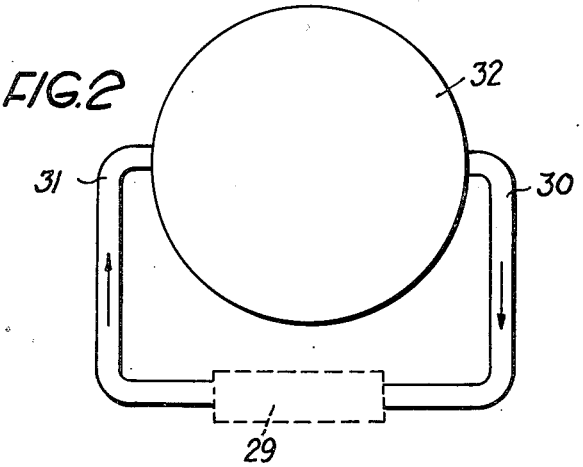

I attain the above objects by mechanism described hereinbelow with reference to the annexed drawing, in which:

Fig. 1 is a sectional view of an apparatus constructed in accordance with the invention; and Fig. 2 diagrammatically illustrates the connection of the apparatus with a treating vessel for the liquid.

Referring to Fig. 1, reference numeral 1 denotes a conduit for the liquid the viscosity or concentration of which is to be measured or controlled. Within the conduit 1, there are fixed two angular members 2 and 3 having radially inwardly extending guide vanes 4 and 5, respectively, which are connected with bearings 6 and 7, respectively. In these bearings there is mounted a central shaft 8 which by means of a rim 9 provided with spokes is rigidly secured to a hollow cylindrical member consisting of three parts 10, 11 and 12. Part 10 constitutes the rotor of an electric motor the stator 13 of which is located externally of and surrounds the conduit 1. The motor advantageously consists of an induction motor fed with constant alternating E. M. F. and constant frequency. By means of conductors 14 and 15, the motor is connected to a suitable source of current, not shown. In the conductor 14, there is provided a current stabilizer 16 which maintains constant the motor voltage independent of variations in the voltage of the source of current.

By means of the part 11 which may consist of a tube of aluminum or similar suitable material, the rotor 10 is rigidly connected with the part 12. The last named part constitutes the rotor of an electric generator the stator 17 of which also is

2 located externally of the conduit 1. By means of conductors 18, 19, a resistance 20, a rectifier 21 and conductors 22 and 23, the stator 17 of the generator is connected with an indicating or registering instrument or with a device for controlling the viscosity or concentration of the liquid in the conduit 1, a milliammeter 24 being shown in the drawing by way of example.

As will be seen from the drawing, the cylindrical member consisting of the rotors 10 and 12 and the connecting tube 11 is mounted for free rotation in the liquid. Said member is rotated exclusively by means of the motor 10, 13. Since the motor is fed with a constant voltage, the speed of the cylindrical member will depend exclusively upon the friction occurring between the member and the liquid in the conduit 1. If the viscosity of the liquid increases, the speed of the member will be reduced correspondingly on account of the increase in friction. Since the speed of the cylindrical member determines the voltage produced by the generator 12, 17, it will be obvious that this voltage will be a function of the viscosity of the liquid. The viscosity or concentration can thus be read off on the milliammeter 24. In view of the fact that the concentration varies at varying temperature of the liquid, it may be suitable to provide a thermometer 25 which by means of a duct 26 communicates with a temperature responsive member 27 extending into the conduit 1.

The guide vanes 4 and 5 serve to eliminate turbulent flow of the liquid passing through the conduit 1 so as to secure a flow not affected by any external disturbances. To the same end, the parts 2, 10, 11, 12 and 3 are constructed with equal inner diameters.

If the apparatus is to be used for measuring or controlling the viscosity or concentration of a stationary liquid, it may be advantageous to impart to the liquid a slight movement, in order to have the liquid in a treatment vessel flow continuously through the apparatus so as to eliminate inaccurate measurements on account of different viscosities in different portions of the liquid. To this end, an impeller 28 may be connected with the shaft 8 or with the cylindrical member so as to maintain a slight circulation of the liquid.

As diagrammatically illustrated in Fig. 2, the apparatus described and indicated by numeral 29, may be provided in a by-pass conduit 30, 31 connected to a vessel 32 for the liquid.

What I claim is:

1. An apparatus for controlling the viscosity of a liquid, comprising a conduit for the liquid, a cylindrical member mounted for rotation in said conduit, an electric motor having a rotor connected with said member and a stator located externally of said conduit, said rotor being mounted for rotation in the liquid containing conduit, means for supplying a constant voltage to said motor, an electric generator having a rotor connected with said member and a stator located externally of said conduit, and means indicating the voltage produced by said generator, said member and said rotors constituting together a rotatable hollow cylindrical body.

2. An apparatus for controlling the viscosity of a liquid, comprising a conduit for the liquid, a cylindrical member mounted for rotation in said conduit, an electric motor having a rotor connected with said member and a stator located externally of said conduit, said rotor being mounted for rotation in the liquid conduit, means for supplying a constant voltage to said motor, an electric generator having a rotor connected with said member and a stator located externally of said conduit, said member and said rotors constituting together a rotatable hollow cylindrical body, an impeller connected with said body, and means indicating the voltage produced by said generator.

HANS ALEXANDER von HORTENAU.

REFERENCES CITED

The following references are of record in the file of this patent:

UNITED STATES PATENTS

| Number | Name | Date |
| --- | --- | --- |
| 2,354,923 | McNamee | Aug. 1, 1944 |
| 2,531,228 | MacGeorge | Nov. 21, 1950 |

FOREIGN PATENTS

| Number | Country | Date |
| --- | --- | --- |
| 654,266 | France | Nov. 28, 1928 |